United States Patent [19]

Melton et al.

[11] 4,109,125

[45] Aug. 22, 1978

[54] CONTACT ARRANGEMENT FOR AN ELECTRIC ARC-ELECTRODE CONSISTING OF GRAPHITE AND A METHOD FOR THE MANUFACTURE THEREOF

[75] Inventors: Keith Nelson Melton, Fislisbach; Renata Sebalj, Neuenhof, both of Switzerland

[73] Assignee: BBC Brown, Boveri & Company Limited, Baden, Switzerland

[21] Appl. No.: 673,549

[22] Filed: Apr. 5, 1976

[30] Foreign Application Priority Data

May 28, 1975 [CH] Switzerland ............. 6805/75

[51] Int. Cl.² ............................................. H01H 1/02
[52] U.S. Cl. ..................................... 200/268; 200/262; 200/48 R; 200/269; 428/552
[58] Field of Search ............. 200/262, 268, 269, 48 R, 200/153 P, 148 R; 29/182.5; 219/121 P; 428/552

[56] References Cited

U.S. PATENT DOCUMENTS

| 2,364,981 | 12/1944 | Journeaux | 200/146 R |
| 2,547,947 | 4/1951 | Kleis et al. | 200/268 X |
| 3,211,869 | 10/1965 | Gonek et al. | 200/148 R |
| 3,889,098 | 6/1975 | Steinmetz et al. | 200/268 |
| 3,895,201 | 7/1975 | Schramm et al. | 200/269 X |

FOREIGN PATENT DOCUMENTS 2,221,630  11/1973  Fed. Rep. of Germany ........... 200/262

Primary Examiner—Benjamin R. Padgett
Assistant Examiner—J. L. Barr
Attorney, Agent, or Firm—Toren, McGeady and Stanger

[57] ABSTRACT

A contact arrangement for a graphite electric arc-electrode employs a contact spud composed of a metal having a high melting point and a soldering layer disposed between the contact spud and graphite electrode. The soldering layer contains at least one carbide forming metal. In one embodiment of the invention, a carbide-forming metal layer is disposed between the graphite electric arc-electrode and the soldering layer. In a preferred form of the method of making the arrangement, the soldering layer and the carbide-forming metal layer are plasma-sprayed or steamed onto the surface to be connected.

5 Claims, 2 Drawing Figures

CONTACT ARRANGEMENT FOR AN ELECTRIC ARC-ELECTRODE CONSISTING OF GRAPHITE AND A METHOD FOR THE MANUFACTURE THEREOF

FIELD OF THE INVENTION

The present invention relates to a contact arrangement for an electric arc-electrode consisting of graphite, and particularly for high-voltage power switches with gaseous isolation means, and a method for the manufacture thereof.

BACKGROUND OF THE INVENTION

It is already known to use graphite for electric arc-electrodes. A solution of this type is described in DT-AS 1,154,548. The contacts or contact spuds of an electric switch, which generate an electric arc upon the switch being switched off, are made of graphite. In switches of this type, graphite contacts are particularly advantageous, if an electro-negative and fluoride-containing gas, particularly sulphurhexafluoride $SF_6$, is employed as a means to extinguish the electric arc. The material loss of graphite contacts is considerably smaller than that of the metallic contact. This is so even if the latter consist of high grade, electric arc-resistant material, such as silver- or copper-wolframite.

Problems arise in electric power switches having graphite electrodes, since the graphite members used as electric arc-electrodes must be mechanically or electrically connected with the current-carrying contacts. Graphite members are not, however, as a rule, of adequate rigidity, and therefore do not permit the cutting of a thread for connection to a contact. In order to increase this mechanical rigidity, it has already been proposed to provide the graphite members with an electrically conducting add-on piece consisting of one or a plurality of metals at positions where a galvanic or mechanical contact with the contact spud takes place (DT-OS 2,221,630).

Another type of attachment of the graphite member to the contact spud is described in DT-OS 2,230,927. The jetshaped electric arc-electrode consisting of graphite is cold-pressed into a tube manufactured from cold-formed copper and surrounded by the latter, employing frictional contact. DT-OS 2,232,314 describes a shrink-fit or connection between the graphite member and the contact spud, which is implemented by means of a ring-shaped metallic member. In order to keep the contact resistance between the graphite member and the contact spud as small as possible, however, one has to expect the exertion of considerably high pressure on the graphite member, which is undesirable in view of the relatively small mechanical rigidity of the graphite. Accordingly, the graphite member may break or rupture during installation or operation.

OBJECTS OF THE INVENTION

It is, therefore, particularly, an object of the present invention to provide a contact arrangement for an arc-electrode consisting of a graphite member, and a method for the manufacture thereof, which obviates the disadvantages of present methods.

It is also an object of the present invention to provide that the connection between the graphite member and the contact or contact spud is electrically well conductive, and that the mechanical stress exerted on the graphite member is not excessive due to such a connection.

SUMMARY OF THE INVENTION

In accordance with the invention, a contact arrangement particularly for high-voltage power switches having a gaseous isolation means comprises an electric arc-electrode consisting of a graphite member, a contact spud consisting essentially of a metal having a high melting point being disposed in at least the surface portion of the electrode and a soldering layer containing at least one carbide-forming metal connecting said contact spud to said electric arc-electrode. In one form of the invention, a carbide-forming metal layer is disposed between the electric arc-electrode and the soldering layer.

In the method aspect of the present invention, the soldering layer and the carbide-forming metal layer are applied to the electric arc-electrode by plasma-spraying or by steaming.

For a better understanding of the present invention, together with other and further objects thereof, reference is had to the following description and accompanying drawings, while the scope of the invention will be pointed out in the appended claims.

DETAILED DESCRIPTION OF THE INVENTION

Figure 1:
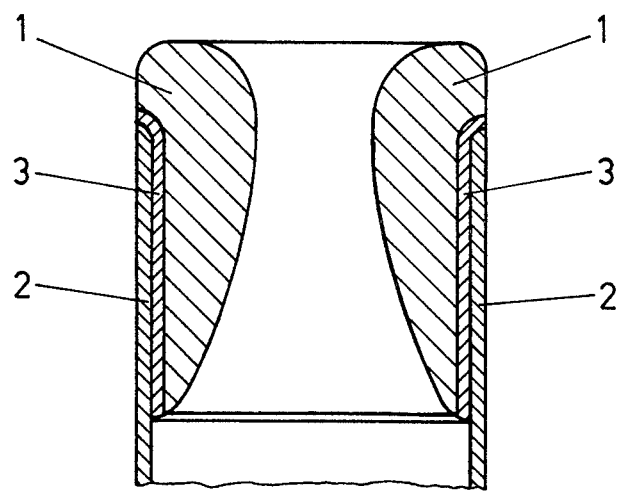
FIG. 1 shows an example of a first embodiment of the invention in longitudinal section.
Figure 2:
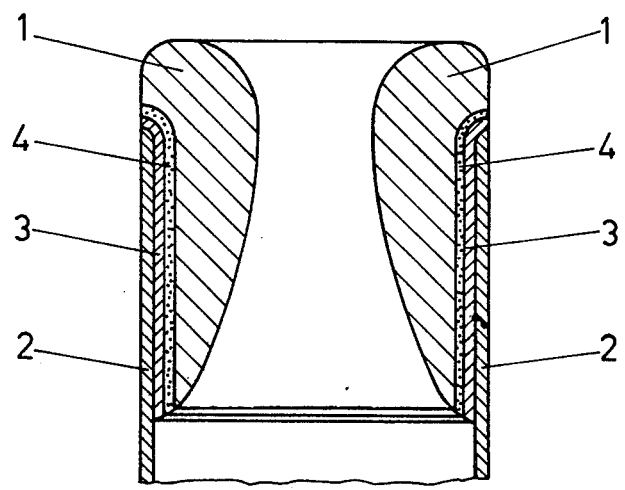
FIG. 2 shows an example of second embodiment of the invention in longitudinal section.

Referring initially to FIG. 1, an electric arc-electrode having a graphite member is denoted with the reference numeral 1. A contact or contact spud composed of a metal having a high melting point is denoted by the reference numeral 2, and a soldering layer containing at least one carbide-forming metal is denoted by the reference numeral 3. Elements in FIG. 2 are denoted by the same reference numerals as for corresponding elements in FIG. 1. A carbide-forming metal layer in FIG. 2 is denoted with the reference numeral 4.

The embodiment shown in FIG. 1 shows a contact arrangement wherein a graphite electric arc-electrode 1 is connected to a contact or contact spud 2 by means of a soldering layer 3. The contact or contact spud 2 consists preferably of molybdenum or a molybdenum-based alloy. In certain cases or circumstances, other metal may also be employed, such as, for example, wolframite or wolframite-based alloys which have a relatively low coefficient of thermal expansion. The soldering layer 3 contains at least one carbide-forming metal in order to obtain a favorable wetting of the graphite. It preferably consists, for example, of an alloy of copper plus 1% chromium. Also, solders with a nickel base are suitable, as for example, 71% Ni, 17% Mo, 7% Cr, 5% Fe or Ni-Cr-B-Si; Ni-Cr-P; Ni-Si-B solders, etc. The use of other solders, having, for example, an Au or Ag-base is also possible.

The second embodiment, according to FIG. 2, shows a carbide-forming metal layer 4 disposed between the graphite electric-arc electrode 1 and the soldering layer 3. The wetting of the graphite is further improved with this metal layer 4, and the mechanical rigidity of the connection is increased still further. The metal layer 4 consists preferably of chrome. It is, of course, possible to use other carbide-forming metals, for example, Zr, Nb, Ta, Hf, etc.

The soldering layer 3 containing at least one carbide-forming metal and/or the carbide-forming metal layer 4 is preferably plasma-sprayed or steamed onto the surface to be connected. It is, of course, possible to use other suitable known methods.

The scope of the invention is, of course, not limited to the figures shown in the drawing. Thus, the contact spud 2 may consist of steel or copper, and may be provided only in the parts to be connected with a layer of molybdenum or of another metal having a low coefficient of thermal expansion. It is also possible to select another suitable form of the electric arc-electrode 1 and the contact spud 2.

Thus, the objects of the invention are met by a contact arrangement which is provided for an electric arcelectrode consisting of a graphite member wherein a contact spud consisting of a metal having a high melting point in at least the surface portion thereof is connected to the electric arcelectrode by means of a soldering layer containing at least one carbide-forming metal. The invention is particularly advantageous when the solder containing, at least, one carbide-forming metal wets the graphite slightly, which permits a good mechanical connection.

It is also particularly advantageous if the contact or contact spud consists, at least in the surface portion thereof which is connected to the electric arc-electrode, of molybdenum or molybdenum-based alloys, or of wolframite or wolframite-based alloys. Molybdenum is particularly suitable as an abutting material, since its thermal coefficient of $4.3 \times 10^{-6}$ per degree C. is very similar to the thermal coefficient of the graphite (approx. $3 \times 10^{-6}$ per degree C.). Considerable tensions in the connecting layer during temperature changes are prevented by this choice. It is further advantageous if the soldering layer consists of a nickel or copper-based solder. These solders containing at least one carbide-forming metal insure a good mechanical and electrically conducting connection.

In a further implementation, it has been shown that there is disposed between the electric arc-electrode consisting of a graphite body, and the soldering layer containing at least one carbide-forming metal, a carbide-forming metal layer. The wetting of the graphite is further improved with this carbide-forming metal layer, resulting in a sufficiently rigid mechanical connection between the graphite and the contact or contact spud so that, when a tension test is applied, the graphite ruptures, and not the connection layer. In a preferred implementation version, the carbide-forming metal layer contains chrome. Tests have shown that the latter metal influences the rigidity of the connection very favorably.

It has been shown to be advantageous to manufacture the contact arrangement for an electric arc-electrode made of graphite according to the invention so that the soldering layer containing at least one carbide-forming metal is plasmasprayed on or steamed on the part of the surface to be connected. It is further advantageous if the carbide-forming metal layer is also plasma-sprayed or steamed on the connecting portion of the surface of an electric arc-electrode consisting of a graphite member. Uniform layers of the deposited material are obtained by this method.

While the present invention has been particularly shown and described with reference to the preferred embodiments thereof, it will be understood by those skilled in the art that various modifications and changes in form and detail may be made therein without departing from the true spirit and scope of the present invention.

In the claims:

1. A contact arrangement particularly for high-voltage power switches having a gaseous isolation means, comprising:
   an electric arc-electrode consisting of a graphite member;
   a contact spud consisting essentially of a metal having a high melting point selected from the group consisting of molybdenum, molybdenum-based alloys, wolframite and wolframite-based alloys being disposed in at least the surface portion of said electrode; and
   a soldering layer containing at least one carbideforming metal disposed between said graphite member and contact spud and connecting said contact spud to said electric arc-electrode.

2. A contact arrangement according to claim 1, wherein the soldering layer consists essentially of a Cu-based solder.

3. A contact arrangement according to claim 1, wherein the soldering layer consists essentially of Ni-based solder.

4. A contact arrangement according to claim 1, wherein a carbide-forming metal layer is disposed between the electric arc-electrode and the soldering layer.

5. A contact arrangement according to claim 1, wherein the carbide-forming metal layer contains chromium.

* * * * *